| United States Patent [19] | [11] 3,860,720 |
| --- | --- |
| Covey | [45] Jan. 14, 1975 |

[54] COMBATING FUNGUS DISEASES OF PLANTS WITH NAPHTHALIC ANHYDRIDE

[75] Inventor: Michael F. Covey, Shawnee, Kans.

[73] Assignee: Gulf Research & Development Company, Pittsburgh, Pa.

[22] Filed: Oct. 6, 1971

[21] Appl. No.: 187,147

[52] U.S. Cl. ............................................... 424/285
[51] Int. Cl. .............................................. A01n 9/28
[58] Field of Search .......................... 424/315, 285

[56] References Cited
UNITED STATES PATENTS
3,117,909   1/1964   Douros et al. ......................... 424/27

OTHER PUBLICATIONS

Chemical Abstracts, Vol. 59 (1963), p. 13219f.

Chemical Abstracts, Vol. 74 (1971), p. 123920k.

*Primary Examiner*—Vincent D. Turner

[57] ABSTRACT

Fungus diseases of plants are combated by applying to foliage or to the soil in the vicinity of the plants 1,8-naphthalic anhydride as a dust or a foliar spray. The method is particularly effective against apple scab and late blight and leaves no accummulation of inorganic residues as a result of repeated use.

3 Claims, No Drawings

COMBATING FUNGUS DISEASES OF PLANTS WITH NAPHTHALIC ANHYDRIDE

DESCRIPTION OF THE INVENTION

Fungus diseases of plants are particularly difficult to combat for a variety of reasons. Fungi are difficult to kill or retard. The fungi infections vary in occurrence and seriousness with variations in climatic conditions from year to year. Particularly serious infestations of fungus diseases usually appear without warning and often without adequate precautions having been taken. There are both soil-borne and airborne fungus diseases of plants, some of which are so prevalent that a few crops are treated with fungicides on a routine basis. However, copper salts and carbamates in particular apparently have some phytotoxicity when used repeatedly and some fungus diseases, such as apple scab have developed resistance from repeated use of the same fungicides. There is a continuing need for new chemical agents for combating fungus diseases so as to avoid both toxic effects on plants and the development of resistant strains of fungus diseases.

I have discovered that naphthalic anhydride, an organic compound which is an article of commerce is effective in combating fungus diseases of plants, both when used as a foliar spray and when applied to the soil in the vicinity of the plants. This chemical agent may be alternated with other fungicides for better control of fungus diseases so as to minimize toxic side effects and the development of resistant strains of fungi.

Naphthalic anhydride is a compound having very low solubility both in water and the majority of solvents, a factor which contributes to its effectiveness as a foliar fungicide since it is not readily dissolved and washed away by rain. Because of its relatively insoluble nature, the compound is conveniently formulated as a wettable powder so that it may be mixed with water and applied as an aqueous foliar spray. An illustrative procedure for preparing a wettable powder is given below:

Preparation of a Wettable Powder

A wettable powder is conveniently formulated by intimate mixing of the active ingredient with inert carriers, wetting agents and dispersing agents. For example, there may be mixed together the following ingredients;

12.75 parts by weight of diatomaceous earth, 17.5 parts of finely divided attapulgite, 17.5 parts of finely divided pyrophyllite, 1.25 parts of a commercial sodium lignosulfonate dispersing agent and 1.0 part of a surfactant such as a fatty acid ester of sodium isethionate. After mixing there may be then added 50 parts by weight of naphthalic anhydride and the entire mixture may then be milled in a high speed impact mill, to obtain intimate mixing and small particle size. The resulting product may then be stirred into water to form an aqueous dispersion for use as a foliar spray, or may be applied as the dry powder to soil in the vicinity of the plant and preferably mixed into the upper few inches of soil during tilling or seed bed preparation.

Control of Fungus Diseases

An illustrative use of a method of this invention is the protection of plants such as tomatoes and potatoes from *Phytopthora infestans* (late blight). The effectiveness of the method may be demonstrated on an experimental scale by means of the procedures described below:

Treatment of Tomato Plants

Bonny Best tomato plants, *Lycopersicon esculentum*, approximately 5 to 6 weeks old, in five-leaf growth stage, are mounted on a compound turntable and sprayed at 30 pounds pressure with the candidate compound in the form of an aqueous dispersion or solution at concentrations indicated in the table. Samples are prepared for spraying by preparing a wettable powder and diluting to desired concentrations with deionized water.

After drying, treated plants are spray-inoculated with a mixed sporangial and zoospore suspension of *Phytopthora infestans* and immediately placed in the incubation chamber maintained at 70° and 95% plus relative humidity. After 40 hours in the incubation chamber, plants are removed and observed for total infection lesions of the top three leaves. Effectiveness of treatments is determined by direct comparison with inoculated controls. Maneb is used as a reference standard. All units of the test include a minimum of three replicates.

Combating Apple Scab

McIntosh apple seedlings in vigorous growing condition, 8 to 10 inches tall, are mounted on a compound turntable and sprayed at 30 pounds pressure with the candidate compound at the concentration indicated in the table. Samples are prepared for spraying with an aqueous solution or dispersion and diluting to desired concentrations with deionized water.

After drying, treated plants are spray-inoculated with a spore suspension of *Venturia inaequalis* and immediately placed in an incubation chamber maintained at 70°F and 95% plus relative humidity. After 40 hours in the incubation chamber plants are removed to the greenhouse for further disease development. Fourteen days after inoculation plants are observed for disease development and control by counting the number of infection loci on the three most heavily infected leaves per plant. Effectiveness of treatments is determined by direct comparison with inoculated controls. Cyprex is used as a reference standard. All units of the test include a minimum of three replicates.

Results of typical tests are tabulated below.

TABLE I

FOLIAR FUNGICIDE
(Percent Control: Plant Injury)

| ppm concentration | Late blight (tomatoes) | Apple Scab |
|---|---|---|
| 1000 | 95:0 | 100:0 |
| 500 | 100:0 | |
| 250 | 100:0 | |
| 100 | 100:0 | |
| Std:ppm | MAN;100 | CPR:100 |
| Primary | 94:0 | 100:0 |
| Retest | 100:0 | |

I claim:

1. A method of combating *Phytopthora* and *Venturia* fungus diseases of plants which comprises applying to the locus of the plants as a foliar spray an aqueous dispersion containing an effective fungicidal amount of 1,8-naphthalic anhydride.

2. A method of combating *Phytopthora infestans* infections of plants which comprises applying to the susceptible plants as a foliar spray an aqueous dispersion containing a fungicidally effective amount of 1,8-naphthalic anhydride.

3. A method of combating apple scab which comprises applying to apple trees as a foliar spray an aqueous dispersion containing a fungicidally effective amount of 1,8-naphthalic anhydride.

* * * * *